(12) United States Patent
Ford et al.

(10) Patent No.: US 9,538,130 B1
(45) Date of Patent: Jan. 3, 2017

(54) DYNAMIC GAZE CORRECTION FOR VIDEO CONFERENCING

(71) Applicant: Dell Software, Inc., Round Rock, TX (US)

(72) Inventors: Daniel A. Ford, Mount Kisco, NY (US); Gabriel M. Silberman, Austin, TX (US)

(73) Assignee: Dell Software, Inc., Round Rock, TX (US)

( * ) Notice: Subject to any disclaimer, the term of this patent is extended or adjusted under 35 U.S.C. 154(b) by 0 days.

(21) Appl. No.: 14/964,731

(22) Filed: Dec. 10, 2015

(51) Int. Cl.
*H04N 7/14* (2006.01)
*G06K 9/00* (2006.01)
*H04N 7/15* (2006.01)
*G06T 11/60* (2006.01)
*G06F 17/30* (2006.01)

(52) U.S. Cl.
CPC .......... *H04N 7/147* (2013.01); *G06F 17/3028* (2013.01); *G06F 17/3033* (2013.01); *G06F 17/30247* (2013.01); *G06K 9/00228* (2013.01); *G06K 9/00288* (2013.01); *G06K 9/00604* (2013.01); *G06K 9/00617* (2013.01); *G06T 11/60* (2013.01); *H04N 7/15* (2013.01)

(58) Field of Classification Search
CPC ...................................................... H04N 7/14
USPC ................................ 348/14.01, 14.16, 14.14
See application file for complete search history.

(56) References Cited

U.S. PATENT DOCUMENTS

| | | | | |
|---|---|---|---|---|
| 8,467,510 B2 * | 6/2013 | Hillis | ....................... | H04N 7/15 348/14.08 |
| 8,957,943 B2 * | 2/2015 | Nourbakhsh | .......... | H04N 7/144 348/14.12 |
| 9,065,967 B2 * | 6/2015 | Hubner | .................. | H04N 7/142 |
| 9,325,939 B2 * | 4/2016 | Schultz | ................ | H04N 7/144 |
| 9,335,820 B2 * | 5/2016 | Wolf | ..................... | H04N 7/144 |
| 2008/0278516 A1 * | 11/2008 | Santon | .................. | H04N 7/144 345/619 |

OTHER PUBLICATIONS

Gemmell, et al., "Implementing Gaze-Corrected VideoConferencing", International Association of Science and Technology for Development; Mar. 2002 (6 pages).
Ott, et al., "Teleconferencing Eye Contact Using a Virtual Camera", CHI '93 INTERACT '93 and CHI '93 Conference Companion on Human Factors in Computing Systems; pp. 109-110; 1993 (2 pages).

* cited by examiner

*Primary Examiner* — Olisa Anwah
(74) *Attorney, Agent, or Firm* — Campbell Stephenson LLP; Shiv S. Naimpally

(57) ABSTRACT

Systems and techniques to dynamically correct a gaze of participants in a video conference are described. A computing device participating in a video conference may determine that a frame of a video stream includes features of a face, extract a portion of the frame that includes a first pair of eyes, and determine that the first pair of eyes are looking in a non-forward direction. The computing device may retrieve, from a database, a stored portion that includes a second pair of eyes that are looking in a forward direction, and modify the frame by substituting the stored portion for the portion in the frame to create a modified frame. The computing device may send the modified frame to a video-conferencing server for distribution to other computing devices participating in the video conference.

20 Claims, 6 Drawing Sheets

DYNAMIC GAZE CORRECTION FOR VIDEO CONFERENCING

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

When using a video conferencing system, a display screen and an imaging device (e.g., video camera) may not be coaxially positioned, e.g., the imaging device may not be located in a center of the display, especially for small devices, such as laptops or cell phones. Most of the time, participants in the video conference may be viewing the display screen, resulting in each participant's image appearing as though the participant's gaze is directed away from, rather than towards, the other participants. If a participant looks at the imaging device, the participant's image may appear to be looking at the other participants, but the participant may not be able to see (or only peripherally see) the participant's own image because the participant is not viewing the display screen. Eye contact is an important part of face-to-face communication for humans, and is an underlying component of social interaction. One of the major reasons for using video conferencing is to enable participants to have face-to-face communications and yet the placement of the imaging device relative to the display screen may not provide the participants with eye contact.

SUMMARY

This Summary provides a simplified form of concepts that are further described below in the Detailed Description. This Summary is not intended to identify key or essential features and should therefore not be used for determining or limiting the scope of the claimed subject matter.

Systems and techniques to dynamically correct a gaze of participants in a video conference are described. A computing device participating in a video conference may determine that a frame of a video stream includes features of a face, extract a portion of the frame that includes a first pair of eyes, and determine that the first pair of eyes are looking in a non-forward direction. The computing device may retrieve, from a database, a stored portion that includes a second pair of eyes that are looking in a forward direction, and modify the frame by substituting the stored portion for the portion in the frame to create a modified frame. The computing device may send the modified frame to a video-conferencing server for distribution to other computing devices participating in the video conference.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
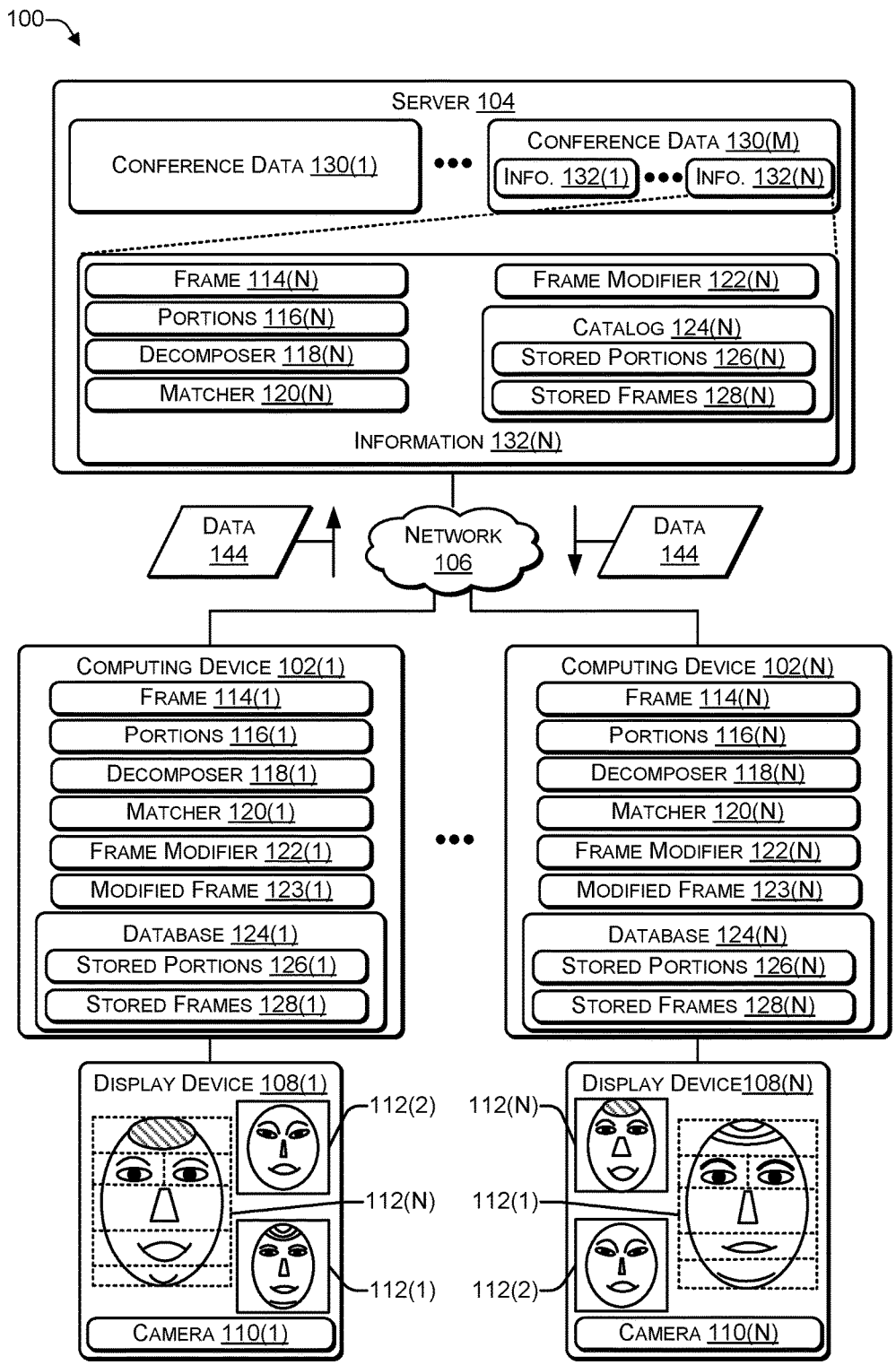
FIG. 1 is a block diagram illustrating a computing system in which frames of a video stream are transmitted according to some embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The techniques and systems described herein may blend (i) a portion of a video frame (e.g., an image) in which a participant's eyes are gazing at an imaging device (e.g., camera) with (ii) a current frame of the participant to create a composite video frame in which the participant appears to be gazing forward (e.g., towards other participants in the video conference).

Each participant in a video conference may perform one or more actions to join the video conference. For example, the actions may include (i) launching a video conferencing software application, (ii) selecting an address, such as a telephone number, a universal resource locator (URL), or other address, (iii) entering a passcode, (iv) say or enter the participant's name, etc. As part of the process of joining a video conference, the software application may prompt the user to look directly at an imaging device (e.g., connected to a computing device that the participant is using to join the video conference) for a predetermined time period (e.g., N seconds, where N>0). For example, the software application may provide a visual cue (e.g., by displaying a message "Please look at the camera for 5 seconds"), an audio cue (e.g., by playing an audio message "Please look at the camera for 5 seconds"), another type of cue, or any combination thereof. While providing the cue, the software application may capture multiple video frames from the imaging device. The software application may store one or more of the captured video frames for use in the video conference. The software application may extract and store one (or more) portions of the captured video frames that include the participant's eyes gazing directly at the imaging device. For example, a classifier or other machine learning algorithm may be used to identify and extract portions of the captured video frames that include the participant's eyes.

The software application may capture frames of a participant during the video conference, extract portions of the captured frames in which the participant appears to be looking forward, and blend the extracted portions with frames in which the participant does not appear to be looking forward. In some implementations, the software application may prompt the participant and capture video frames (i) when the software application is used to join a video conference for the first time, (ii) each time the participant initiates the process of joining a video conference or (iii) the software application may request user input as to whether to use previously stored frame(s) or capture new frame(s). For example, the first time the participant uses the software application to join a video conference, the software application may prompt the user to temporarily gaze at the video camera, capture one or more frames, store the frames or portions of the frames that include the participant's eyes, and use the stored frames or portions of the frames for the video conference and for subsequent video conferences. As another example, each time the participant uses the software application to join a video conference, the software application may prompt the user to temporarily gaze at the video camera, capture one or more frames, store the frames or portions of the frames that include the participant's eyes, and use the stored frames or portions of the frames for the video conference. As yet another example, each time the participant uses the software application to join a video conference, the software application may display previously captured frame(s) and prompt the participant, "Do you wish to use previously captured frame(s) or do you wish to capture new frame(s)?"

During the video conference, the software application may capture frames in a video stream, identify those frames in which the participant does not appear to be gazing forward, and blend a previously extracted portion of a frame that includes the participant's eyes (e.g., gazing at the camera) with the frames to create modified frames in which the participant appears to be gazing forward (e.g. at the other participants in the video conference). For example, photo stitching software may be used to blend the extracted portion with the captured frames to create the modified frames. The photo stitching software may detect features, identify overlapping pixels, and use various image manipulation techniques (e.g., white balancing, color correction, etc.) to blend the extracted portion with the captured frames to create the modified frames.

Thus, a software application may blend a portion of a previous captured video frame (e.g., a portion in which the eyes of a participant appear to look forward) with one or more video frames that are being captured (e.g., "live") by the camera. The software application may create one or more modified frames in which the user appears to be looking at the camera (e.g., making "eye contact" with the other participants), even when the participant's gaze in the captured frames may appear to be directed away from the other participants (e.g., because the participant is looking towards a display screen).

The portions of previously captured video frame that may be blended with the one or more video frames may include more than just the eyes of the participant, in order to produce more realistic (e.g., natural look) frames. For example, the portions being blended with frames to create modified frames may include the participant's eyes, the participant's eyebrows, the participant's forehead, the participant's nose, the participant's lips, another part of the participant's face, or any combination thereof.

In addition, if the participants are arranged according to a spatial arrangement, the portions being blended with the frames to create modified frames may include eye gaze positions to make the participant appear to be looking at the participants according to the spatial arrangement. For example, assume that a video conference has three participants in two locations. A first participant is located in a first location and the second and the third participants are located in a second location, with the second and third participants using a single camera to participate in the video conference. Data may be provided to the video conferencing system that the second participant is seated to the right of the camera and the third participant is seated to the left of the camera. The software application may capture frames and extract portions in which the first participant is gazing left and portions in which the first participant is gazing right and blend the extracted portions with captured frames to make the first participant gaze at the second or third participant. For example, the software application may alternately blend the extracted portions with captured frames to make the modified frames appear as though the first participant is alternately gazing at the second or the third participant. As another example, the software may use voice recognition to identify whether the second participant or the third participant was the last person to speak and, when the first participant begins speaking, create a composite frame to make the first participant look in a direction of the last person to speak.

Thus, the software application may take captured frames of a video stream and modify captured frames in which the participant does not appear to be gazing forward to create modified frames in which the participant appears to be gazing forward, regardless of the location of the camera on the computing device. The process of blending portions in which the participant's eyes appear to be looking forward with frames of the video stream may be performed by a sending device, by a cloud-based service, by the video conferencing server, by a receiving device, or any combination thereof. For example, if the sending device lacks sufficient processing power to blend the portion with the frame, the sending device may identify a portion to blend with a frame and send both the portion and the frame. The video conferencing server or the receiving device may blend the portion with the frame to create a modified frame. The video stream may comply with one or more video conferencing standards or protocols, such as H.320, H.323, H.264, V.80, session initiation protocol (SIP), high efficiency video codec (HEVC), another type of video conferencing standard/protocol, or any combination thereof.

FIG. 1 is a block diagram illustrating a computing system in which frames of a video stream are transmitted according to some embodiments. The system 100 may include multiple computing devices 102(1) to 102(N) (where N>0) connected to a server 104 via a network 106. The server 104 may include software, hardware, or both to enable to the server 104 to manage multiple videoconferencing sessions, including a video conferencing session between the computing devices 102(1) to 102(N). The network 106 may include various wired protocols or wireless protocols, such as, for example, Ethernet, CDMA, GSM, Bluetooth®, WiFi®, other networking protocols, or any combination thereof.

The computing devices 102(1) to 102(N) may include a variety of devices, such as, for example, desktop computing devices, laptops, netbooks, tablets, wireless phones, media playback devices, media capture devices, etc. Each of the computing devices 102 may have an associated display device 108. For example, as illustrated in FIG. 1, the computing device 102(1) may have an associated display device 108(1) and the computing device 102(N) may have an associated display device 108(N). Each of the display devices 108(1) to 108(N) may have an associated imaging device, such as a camera, capable of capturing frames (e.g., images) at P frames per second (where P>0). Typical frame rates for videoconferencing may include 15 frames per second (fps), 30 fps, or 60 fps. Of course, depending on the implementation, other frame rates may be used. For example, as illustrated in FIG. 1, the display device 108(1) may have an associated camera 110(1) and the display device 108(N) may have an associated camera 110(N).

Each of the display devices 108 may display one or more windows in which frames of a video stream may be displayed. For example, each of the display devices 108 may display a window in which data (e.g., frames of a video stream) sent from another device is displayed. In some cases, at least some of the display devices 108 may display a window in which data (e.g., frames of a video stream) being sent from the associated computing device is displayed. For example, in a video conferencing session with three participants, the display device 108(1) may display a window 112(1) in which data (e.g., frames of the video stream) being sent from the computing device 102(1) is displayed, a window 112(2) in which data being sent from a computing device 102(2) is displayed, and a window 112(N) in which data being sent from the computing device 102(N) is displayed. As another example, in a video conferencing session with four participants, the display device 108(1) may display a window 112(1) in which data being sent from a computing device 102(3) is displayed, a window 112(2) in which data being sent from the computing device 102(2) is displayed, and a window 112(N) in which data being sent from the computing device 102(N) is displayed.

In some cases, the windows 112 may each be approximately the same size, while in other cases, two (or more) of the windows 112 may differ in size. As illustrated in FIG. 1, the window 112(N) may be larger than the remaining windows 112(1) and 112(2). For example, the audio portion of each video stream may be monitored (e.g., by the receiving device(s), the server 104, or both) to identify a video stream with the loudest corresponding audio stream among the multiple video streams, indicating that the participant in the video stream is speaking. The window in which the video stream with the loudest corresponding audio stream is being displayed may be enlarged. As illustrated in FIG. 1, the window 112(N) may be larger than the windows 112(1) and 112(2) because the participant depicted in the frames of the video stream displayed in the window 112(N) is currently speaking. When the participant depicted in the frames of the video stream displayed in the window 112(2) begins speaking, the window 112(2) may be enlarged and the window 112(N) may be shrunk.

The cameras 110 may capture a video stream (including an audio stream) that includes frames at a particular frame rate (e.g., 15 fps, 30, fps, 60 fps, or the like) and send each captured frame to the associated computing device 102. For example, the camera 110(1) may capture and send a frame 114(1) to the computing device 102(1). The camera 110(N) may capture and send a frame 114(N) to the computing device 102(N).

Each computing device 102 may include memory to store data, such as a frame 114 and a set of (one or more) portions 116. The memory of each computing device 102 may include software modules, such as a decomposer software module 118 to decompose the frame 114 into the set of portions 116, a matcher module 120 that determines whether a previously stored portion may be used to create a modified frame 123, and a frame modifier module 122 to modify a frame using a set of portions received from another computing device. The decomposer software module 118 may decompose the frame 114 into multiple portions, with at least some of the portions including specified facial features. For example to modify a frame to make a participant appear to be looking forward, the decomposer software module 118 may identify (i) a portion that includes a left eye and a portion that includes a right eye or (ii) a portion that includes both eyes. Of course, the decomposer software module 118 may decompose the frame 114 into portions that include other facial features and portions that include a remainder of the face or a remainder of the frame 114. The decomposer software module 118 may include a machine learning algorithm, such as a classifier, that is trained to identify one or more facial features, such as eyes, mouth, nose, forehead, eyebrows, etc. In FIG. 1, The decomposer software module 118(1) may decompose the frame 114(1) into a set of portions 116(1). The decomposer software module 118(N) may decompose the frame 114(N) into a set of portions 116(N). The decomposer software modules 118 may perform facial feature recognition on the frames 114 such that the portions 116 include specified facial features of a participant's face and remainder portions that do not include the specified facial features.

The memory of each computing device may include a database 124 with information about frames that have been stored and portions of frames that have been stored. For example, the database 124(1) may include stored portions 126(1) and stored frames 128(1) and the database 124(N) may include stored portions 126(N) and stored frames 128(N). The stored portions 126(1) to 126(N) may include portions of previously captured frames that include specified facial features, such as, for example, portions in which the participant's eyes appear to be looking forward. The frame modifier 122 may combine one or more of the stored portions 126 with the corresponding frames 114 to create modified frames 123 in which the participant's eyes appear to be looking forward. For example, the frame modifier 122(1) may combine one or more of the stored portions 126(1) with the frame 114(1) to create a modified frame 123(1) in which the eyes of a participant (e.g., who is associated with the computing device 102(1)) appear to be looking forward. Similarly, the frame modifier 122(N) may combine one or more of the stored portions 126(N) with the frame 114(N) to create a modified frame 123(N) in which the eyes of a participant (e.g., in the view of the camera 110(N)) appear to be looking forward.

The server 104 may be a multi-hosting server capable of managing multiple video conferencing sessions substantially simultaneously (e.g., in parallel). For example, the server 104 may store conference data 130(1) associated with a first video conference and conference data 130(M) associated with an Mth video conference (e.g., where M>0). The conference data 130(M) may include information associated with each of the participating devices. For example, the conference data 130(M) may be associated with a video conferencing session in which the computing devices 102(1) to 102(N) are participating. To illustrate, information 132(N) may be associated with the computing device 102(N). The information 132(N) may include an internet protocol (IP) address associated with the computing device 102(N), an available bandwidth of a communication link between the server 104 and the computing device 102(N), a frame rate associated with video streams sent from the computing device 102(N), other information associated with the computing device 102(N) or any combination thereof.

The computing device 102(1) may receive the frame 114(1) from the camera 110(1). In some implementations, the computing device 102(1) instruct the display device 102(1) to display the frame 114(1) in a window, such as the window 112(1). The decomposer module 118(1) may decompose the frame 114(1) into the set of portions 116(1). For example, when using the frame modifier 122 to correct a gaze of participants, a first portion may include the eyes of a participant and a second portion may include a remainder of a face (e.g., excluding the eyes) of the participant. As another example, a first portion may include a left eye of a participant, a second portion may include a right eye of a participant, and a third portion may include a remainder of a face (e.g., excluding the eyes) of the participant.

The matcher module 120(1) may determine whether the portions that include the specified facial features (e.g., eyes) meet particular criteria (e.g., are the eyes facing forward). For example, a machine learning algorithm, such as a classifier, may be trained to recognize portions of images in which an eye appears (or a pair of eyes appear) to be looking in a forward direction.

Each of the computing devices 102(1) to 102(N) participating in the video conference may send data 144 to the server 104. The data 144 may include a frame or a modified frame, along with other conferencing-related data. For example, if the computing device 102(1) determines that a participant's eyes appear to be looking forward in the frame 114(1), the computing device 102(1) may send the frame 114(1) in the data 144, for distribution to other devices participating in the video conference. If the computing device 102(1) determines that a participant's eyes do not appear to be looking forward in the frame 114(1), the computing device 102(1) may create a modified frame 123(1) based on the frame 114(1) and one or more of the stored portions 126(1), and send the modified frame in the data 144, for distribution to other devices participating in the video conference.

The server 104 may receive the data 144 from the computing device 102(1), determine addresses of devices participating in the video conference (e.g., based on the conference data 130(M)), and distribute the data 144 to the other devices, e.g., the devices 102(2) to 102(N). The data 144 may include the frame 114 or the modified frame 132 as part of a video stream (the video stream may include audio data). The data 144 may include information indicating an origination device (e.g., of the computing devices 102) and the server 104 may include the originating device information when distributing the data 144 to participating devices.

In some implementations, the server 104 may include data and one or more software modules associated with individual ones of the computing devices 102(1) to 102(N). For example, the server 104 may include software modules, such as the decomposer module 118(N), the matcher module 120(N), and the frame modifier module 122(N) associated with the computing device 102(N). The server 104 may include data, such as the frame 114(N), the portions 116(N), and the database 124(N) including the stored portions 126(N) and the stored frames 128(N) associated with the computing device 102(N).

Each of the computing devices participating in the video conference may receive the data 144, retrieve the frame 114 or the modified frame 123 from the data 144, and display the frame 114 or the modified frame 123 in one of the windows 112. For example, the computing device 102(N) may receive the data 144 via the server 104 and display the frame 114(1) or the modified frame 123(1) from the data 144, and display the frame 114(1) or the modified frame 123(1) in the window 112(1).

The process of blending portions in which the participant's eyes appear to be looking forward with frames of the video stream may be performed by a sending device of the computing devices 102(1) to 102(N), by a cloud-based service, by the server 104, by a receiving device of the computing devices 102(1) to 102(N), or any combination thereof. For example, if the computing device 102(1) lacks sufficient processing power to blend one of the stored portions 126(1) with the frame 114(1), the computing device 102(1) may identify one of the stored portions 126(1) to blend with the frame 114(1) and send both to the server 104 in the data 144. The server 104 or one or more of the receiving computing devices (e.g., the computing device 102(N)) may blend the portion with the frame 114(1) to create the modified frame 123(1).

Thus, for each frame in a video stream, the frame may be decomposed into multiple portions, with at least one portion including a particular part of a face (e.g., eyes). A determination may be made whether the particular part of the face matches particular criteria (e.g., the eyes appear to be looking forward). If the particular part of the face matches the particular criteria (e.g., eyes appear to be looking forward), the frame may be sent to a server for distribution to other computing devices participating in a video conference. If the particular part of the face does not match the particular criteria (e.g., eyes do not appear to be looking forward), a previously stored portion that matches the particular criteria may be blended with the frame to create a modified frame, and the modified frame may be sent to a server for distribution to the other computing devices participating in the video conference.

In some implementations, two or more of the various operations described herein may be performed substantially in parallel (e.g., in a multi-threaded environment). For example, the decomposer module 118(N), the matcher module 102(N), and the frame modifier module 122(N) may execute substantially in parallel in the computing device 102(N). For example, the matcher module 120(N) may determine whether the portions 116(N) that include a particular facial part satisfy one or more criteria at substantially the same time that (i) the frame modifier 122(N) is creating a modified frame based on a frame prior the frame 114(N) and (ii) the decomposer module 118(N) is decomposing a frame subsequent to the frame 114(N).

Figure 2:
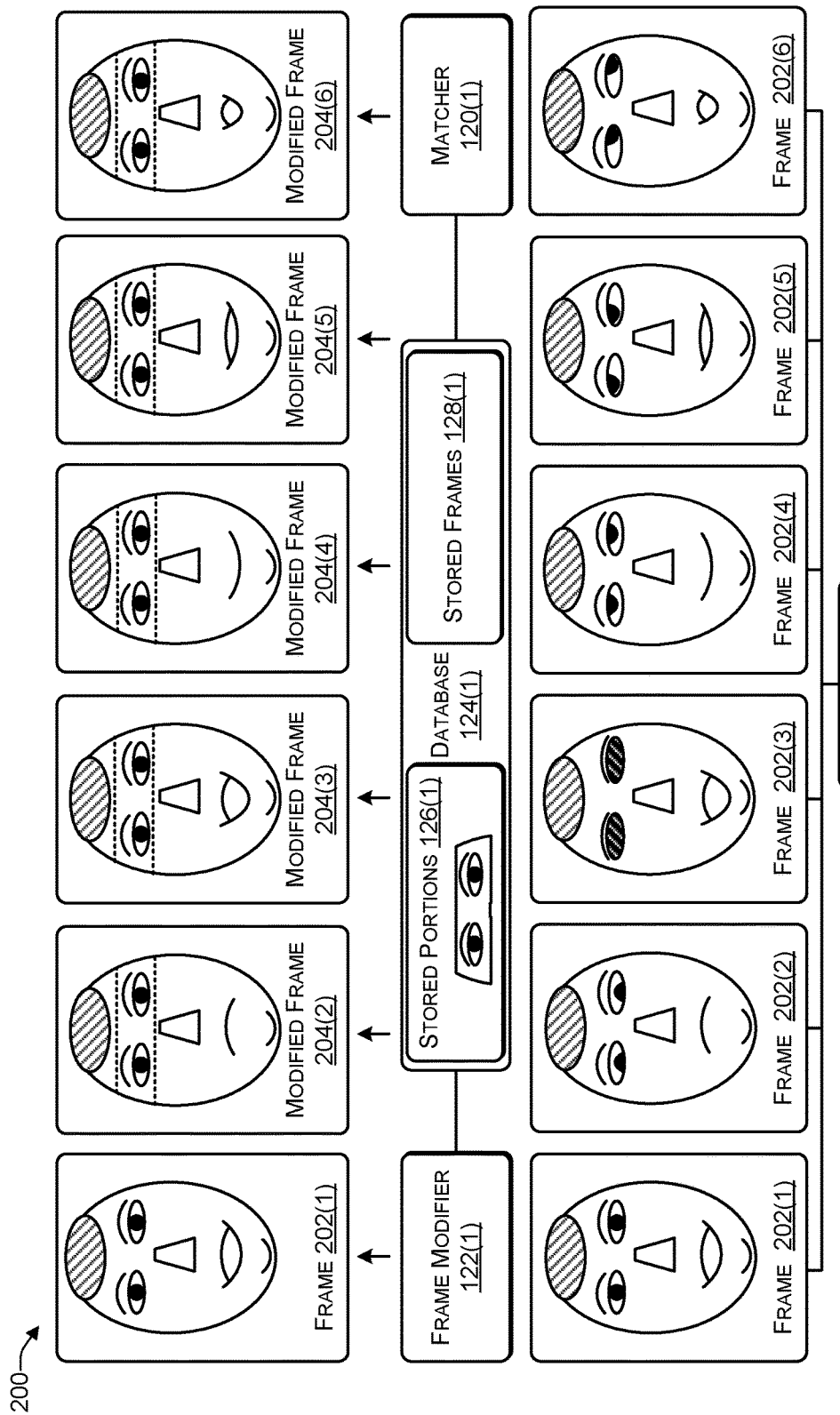
FIG. 2 is a block diagram illustrating modifying a frame using a stored portion to create a modified frame according to some embodiments.

FIG. 2 is a block diagram 200 illustrating modifying a frame using a stored portion to create a modified frame according to some embodiments. The camera 110(1) may capture a series of frames of a video stream, such as frames 202(1), 202(2), 202(3), 202(4), 202(5), and 202(6). The matcher 120(1) may determine whether each of the frames 202 includes a particular part of a face (e.g., one eye or both eyes) that specifies particular criteria (e.g., each eye appears to be looking forward). For example, the matcher 120(1) may determine that the frame 202(1) includes one or more eyes that appear to be looking forward. In response, the computing device 102(1) of FIG. 1 may send the frame 202(1) to the server 104 for distribution to other participating devices. While FIG. 2 describes techniques to modify the frames 202 using the stored portions 126(1) that include both eyes, similar techniques may be used to modify the frames 202 when the stored portions 126(1) include a single eye. For example, at least some of the stored portions 126(1) may include a single eye. As another example, a first catalog (e.g., database) may include left eyes and a second catalog may include right eyes, etc.

The matcher 120(1) may determine that the frame 202(2) includes eyes that do not appear to be looking forward (e.g., participant appears to be looking down). In response, the frame modifier 122(1) may retrieve one or more of the stored portions 126(1) and combine the one or more stored portions 126(1) with the frame 202(2) to create the modified frame 204(2) in which a participant appears to be looking forward. The computing device 102(1) may send the modified frame 204(2) to the server 104 for distribution to other participating devices.

The matcher 120(1) may determine that the frame 202(3) includes eyes that do not appear to be looking forward (e.g., participant's eyes appear closed). In response, the frame modifier 122(1) may retrieve one or more of the stored portions 126(1), combine the one or more stored portions 126(1) with the frame 202(3) to create the modified frame 204(3), and send the modified frame 204(3) to the server 104 for distribution to other participating devices. In the modified frame 204(3), the participant may appear to be looking forward. The matcher 120(1) may determine that the frame 202(4) includes eyes that do not appear to be looking forward (e.g., participant appears to be looking up). In response, the frame modifier 122(1) may retrieve one or more of the stored portions 126(1) and combine the one or more stored portions 126(1) with the frame 202(4) to create the modified frame 204(4) in which a participant appears to be looking forward, and send the modified frame 204(4) to the server 104 for distribution to other participating devices. The matcher 120(1) may determine that the frame 202(5) includes eyes that do not appear to be looking forward (e.g., participant appears to be looking to one side, participant's right), combine one or more of the stored portions 126(1) with the frame 202(5) to create the modified frame 204(5), and send the modified frame 204(5) to the server 104 for distribution to other participating devices. The matcher 120(1) may determine that the frame 202(6) includes eyes that do not appear to be looking forward (e.g., participant appears to be looking to another side, participant's left), combine one or more of the stored portions 126(1) with the frame 202(6) to create the modified frame 204(6), and send the modified frame 204(6) to the server 104 for distribution to other participating devices.

Thus, a frame may be analyzed to determine whether particular parts of the face (e.g., the eyes) satisfy one or more criteria (e.g., appear to be looking forward). If the particular parts of the face satisfy the criteria, the frame may be sent (e.g., without modification) to a server for distribution to other participating devices. If the particular parts of the face fail to satisfy the criteria, the frame may be modified by blending one or more previously stored portions of frames with the frame to create a modified frame, and the modified frame may be sent to a server for distribution to other participating devices. The stored portions may include particular parts of the face (e.g., the eyes) that satisfy the one or more criteria (e.g., appear to be looking forward). Thus, in the modified frame, the particular parts of the face may satisfy the one or more criteria, e.g., the modified frames 204(2), 204(3), 204(4), 204(5), and 204(6) may make a participant appear to be looking forward, even though, in the original frames 202(2), 202(3), 202(4), 202(5), and 202(6), the participant does not appear to be looking forward.

Figure 3:
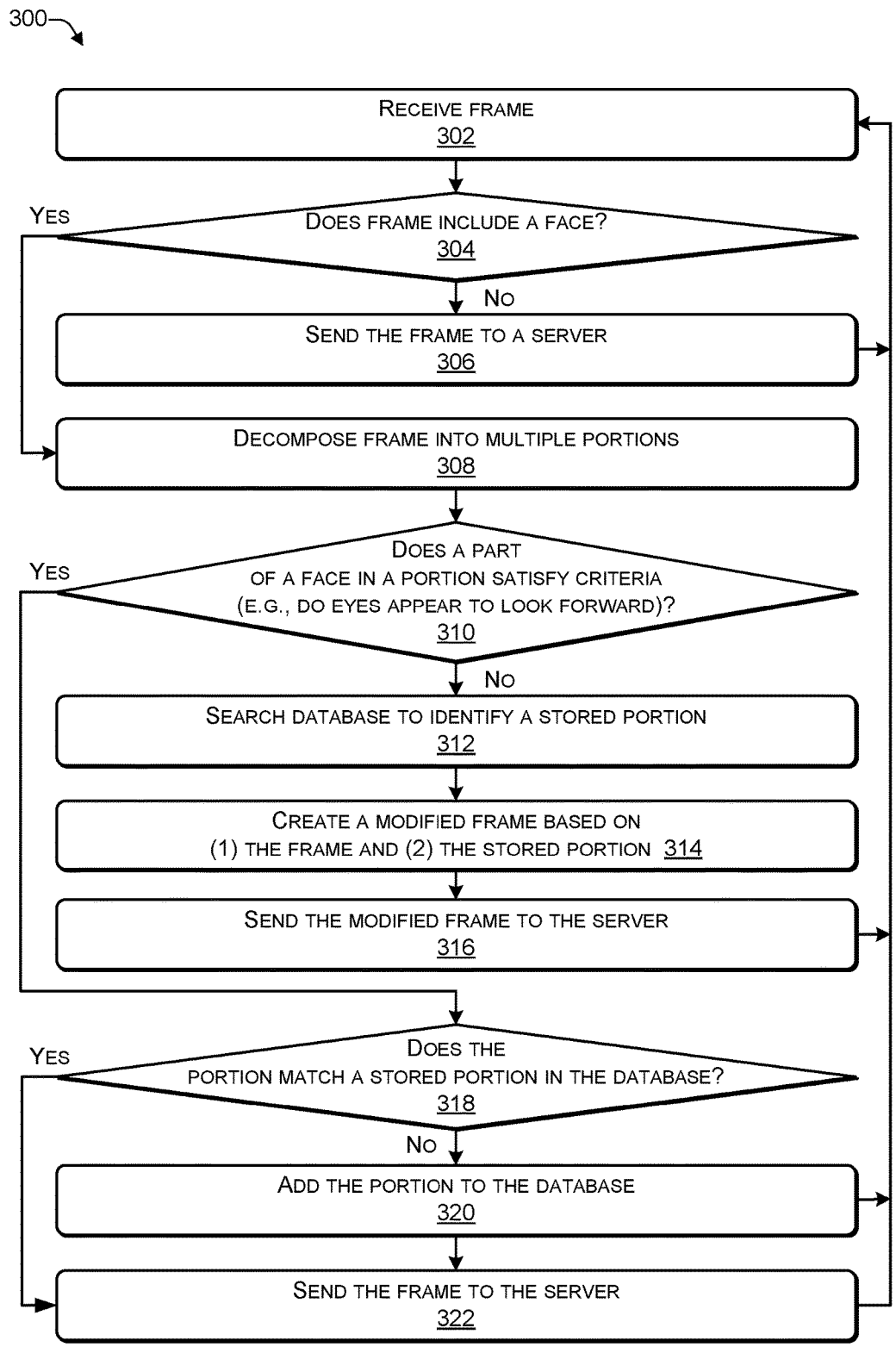
FIG. 3 is a flowchart of a process that includes extracting a portion of a frame that includes a particular part of a face according to some embodiments.
Figure 4:
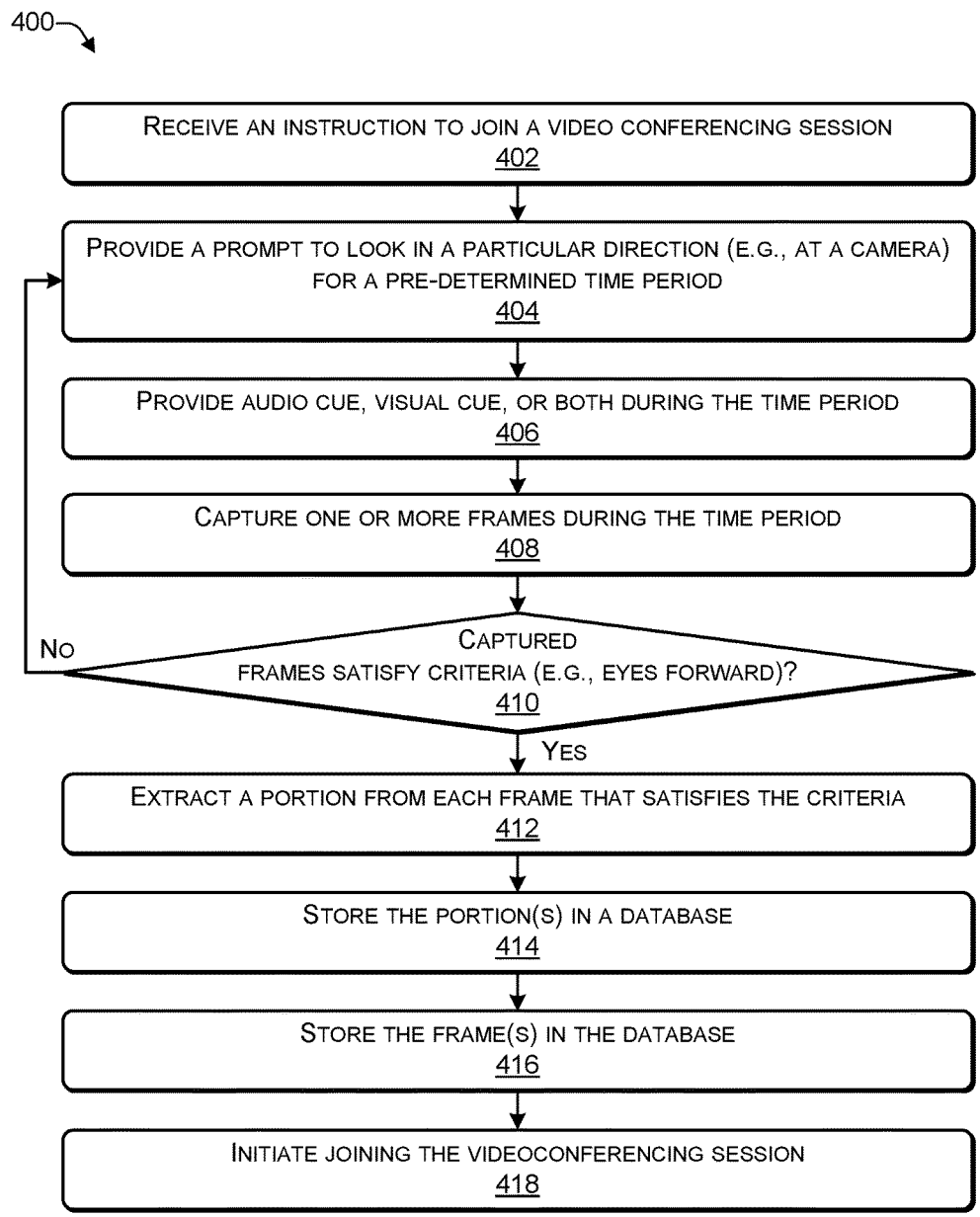
FIG. 4 is a flowchart of a process that includes capturing one or more frames in which a user is looking in a particular direction according to some embodiments.
Figure 5:
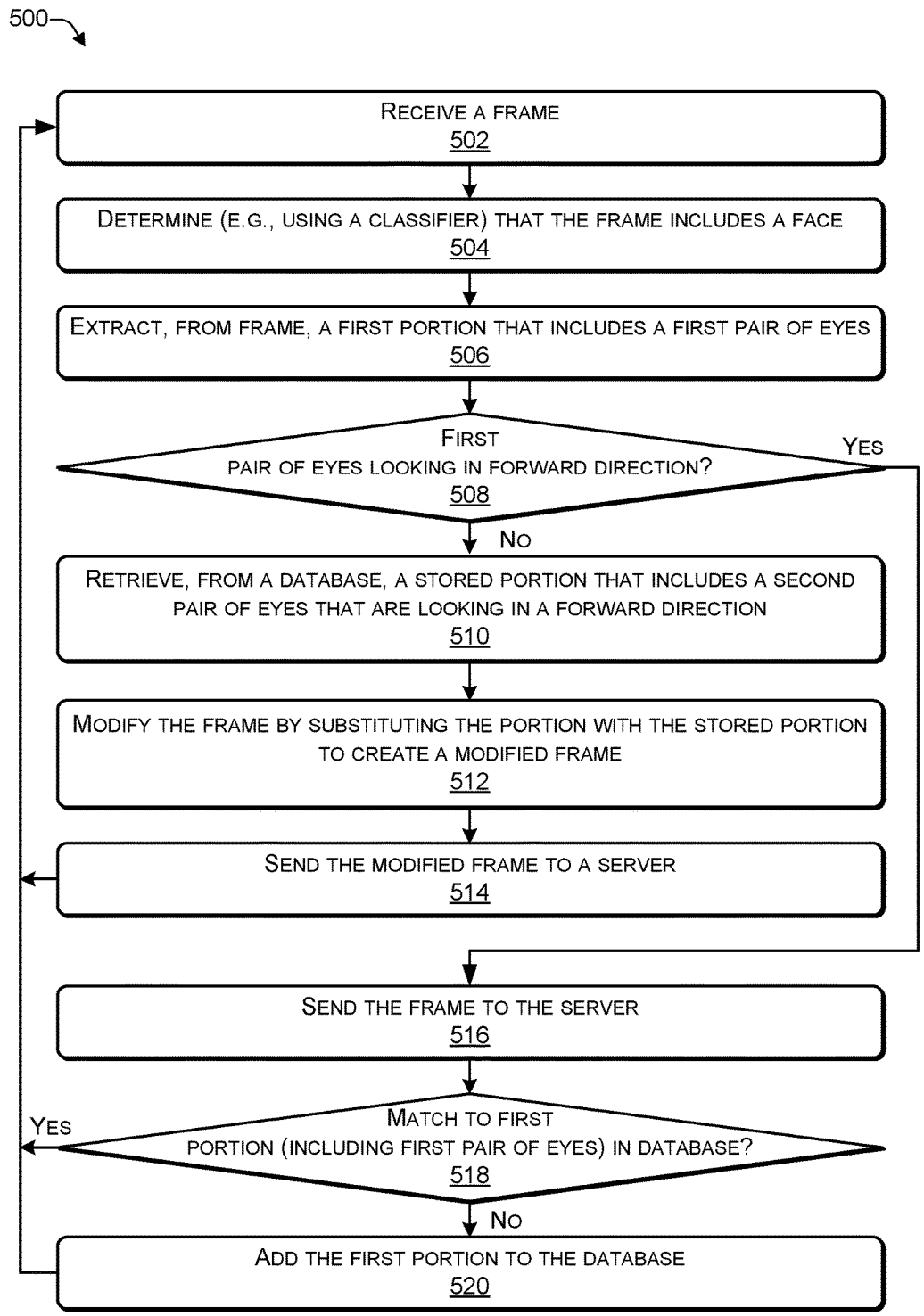
FIG. 5 is a flowchart of a process that includes determining that a frame includes a face according to some embodiments.

In the flow diagrams of FIGS. 3, 4, and 5, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 300, 400, and 500 are described with reference to FIGS. 1 and 2, as described above, although other models, frameworks, systems and environments may implement these processes.

FIG. 3 is a flowchart of a process 300 that includes extracting a portion of a frame that includes a particular part of a face according to some embodiments. The process 300 may be performed by one or more software modules executing on the server 104, or executing on one or more of the computing devices 102(1) to 102(N).

At 302, a frame of a video stream (e.g., being used in a video conference) may be received. At 304, a determination may be made (e.g., using a classifier) whether the frame includes a face. In response to determining, at 304, that ("no") the frame does not include a face of a human being, the frame may be sent to a server, at 306, and the process may proceed to 302 to receive a next frame. For example, in FIG. 1, the computing device 102(1) may receive the frame 114(1) from the camera 110(1), determine (e.g., using a classifier) whether the frame 114(1) includes a face, and send the frame 114(1) in the data 144 in response to determining that the frame 114(1) does not include a face of a human being.

In response to determining, at 304, that ("yes") the frame includes a face, the frame may be decomposed into multiple portions, at 308. At 310, a determination may be made whether a portion that includes a particular part of a face satisfies one or more criteria (e.g., do the eyes appear to be looking forward). In response to determining, at 310, that ("no") the part of the face in the portion does not satisfy the criteria, a database may be searched to identify a stored portion (e.g., in which the eyes appear to look forward). For example, in FIG. 1, in response to determining (e.g., using a classifier) that the frame 114(1) includes the face of a human, the decomposer 118(1) may decompose the frame 114(1) into the portions 116(1). At least one of the portions 116(1) may include a part (e.g., an eye, a pair of eyes, a mouth, a nose, an eyebrow, a forehead, etc.) of a face. The decomposer 118(1) may determine whether one or more of the portions 116(1) that include a particular part of a face satisfy one or more criteria. For example, the decomposer 118(1) may determine whether individual eyes or both eyes in one or more of the portions 116(1) appear to be looking forward. In response to the decomposer 118(1) determining that the parts of the face in the portions 116(1) does not satisfy the criteria (e.g., the eyes in the portions 116(1) do not appear to be looking forward), the matcher 120(1) may search the database 124(1) to identify one or more of the stored portions 126(1) in which the parts satisfy the criteria (e.g., in which the eyes appear to look forward). For example, the matcher 120(1) may identify one or more of the stored portions 126(1) in which (i) the eyes appear to look forward and (ii) match the portions 116(1). To perform a match, the matcher 120(1) may create a hash (or other type of fingerprint) of the portions 116(1) and compare them to stored hashes associated with the stored portions 126(1).

At 314, a modified frame may be created based on the frame and the stored portions. At 316, the modified frame may be sent to the server, and the process may proceed to 302, to receive a next frame. For example, in FIG. 1, one or more of the stored portions 126(1) may be combined with the frame 114(1) or the portions 116(1) to create the modified frame 123(1) in which the eyes appear to be looking forward.

In response to determining, at 310, that ("yes") the part of the face in the portion satisfies the criteria, a determination may be made whether the portion is stored in the database (e.g., whether the portion matches a stored portion in the database). In response to determining, at 318, that ("no") the portion is not stored in the database, the portion may be added to (e.g., stored in) the database, the frame may be sent to the server, at 322, and the process may proceed to 302 to receive a next frame. In response to determining, at 318, that ("yes") the portion was previously stored in the database, the frame may be sent to the server, at 322, and the process may proceed to 302 to receive a next frame. For example, in FIG. 1, if a classifier executing on the computing device 102(1) determines that the eyes in the portions 116(1) appear to be looking forward, then the matcher 120(1) may determine whether the portions 116(1) that include the eyes match one or more of the stored portions 126(1). If the portions 116(1) that include the eyes fail to match any of the stored portions 126(1), the portions 116(1) that include the eyes may be added to the database 124(1), and the frame 114(1) may be sent to the server 104. If the portions 116(1) that include the eyes match one or more of the stored portions 126(1), the portions 116(1) that include the eyes may be added to the database 124(1), and the frame 114(1) may be sent to the server 104.

Thus, a frame of a video stream may be received from an imaging device. If the frame does not include a face, the frame may be sent to a server. If the frame includes a face, the frame may be decomposed into at least two portions, a first portion that includes the eyes and a second portion that includes a remainder of the face (or a remainder of the frame). If a classifier determines that the eyes in the first portion do not appear to be looking forward, a search may be done to identify a previously stored portion in which the eyes appear to be looking forward, the previously stored portion may be blended with the frame (or the second portion that includes a remainder of the frame) to create a modified frame. For example, photography stitching software may be used to perform color balancing and pixel matching to combine the previously stored portion with the frame (or the second portion that includes a remainder of the frame) to create a modified frame. The modified frame may be sent to the server. If the classifier determines that the eyes in the first portion appear to be looking forward, a search may be done to determine if the first portion matches a previously stored portion in the database. If the first portion does not match any of the previously stored portions in the database, the first portion may be stored in the database, and the frame may be sent to the server. If the first portion matches at least one of the previously stored portions in the database, the frame may be sent to the server. In this way, if a frame is captured in which the participant appears to be looking forward, the portion that includes the eyes may be added to the database if a similar (e.g., matching) portion is not included in the database. If a frame is captured in which the participant does not appear to be looking forward (e.g., appears to be looking up, down, to the side, etc.), a stored portion in which the participant appears to be looking forward may be combined with the frame to create a modified frame in which the participant appears to be looking forward.

FIG. 4 is a flowchart of a process 400 that includes capturing one or more frames in which a user is looking in a particular direction according to some embodiments. The process 400 may be performed by one or more software modules executing on the server 104, or executing on one or more of the computing devices 102(1) to 102(N).

At 402, an instruction to join a video conferencing session may be received. At 404, a prompt to look in a particular direction (e.g., at a camera) for a pre-determined time period may be provided. At 406, an audio cue, a visual cue, or both may be provided during the pre-determined time period. At 408, one or more frames may be captured during the pre-determined time period. For example, in FIG. 1, a user of the computing device 102(1) may provide an instruction to the computing device 102(1) to join a video conferencing session. To illustrate, the user may select an address of a video conferencing session, such as a universal resource locator (URL), a phone number, an email address, or another type of address, to initiate joining the video conferencing session. In response, the computing device 102(1) may play an audio prompt or display a visual prompt for the user to look in a particular direction, such as at a camera, for a pre-determined period of time (e.g., "please look in the direction of the camera that is mounted at the top of the display device for five seconds"). In some cases, the audio prompt or the visual prompt may provide an indication during the pre-determined period of time and when the pre-determined period of time has lapsed (e.g. "five . . . four . . . three . . . two . . . one . . . you may now stop looking in the direction of the camera"). During the pre-determined time period, the computing device 102(1) may receive one or more frames (e.g., images) captured by the display device 108(1).

At 410, a determination may be made whether each of the captured frames satisfies one or more criteria. In response to determining, at 410, that none of the captured frames satisfy the one or more criteria, the process may proceed to 404, where a prompt is provided to the user to look in a particular direction for a pre-determined period of time. In response to determining, at 410, that a threshold number (e.g., at least one) of the captured frames satisfy the one or more criteria, a portion (e.g., in which the eyes appear to be looking forward) may be extracted from the captured frames that satisfy the one or more criteria, at 412. At 414, the portions may be stored in a database. At 416, the frames may be stored in the database. For example, in FIG. 1, a machine learning algorithm (e.g., a classifier) executed by the computing device 102(1) may determine whether each of the captured frames includes at least one eye that appears to be looking forward. In response to determining that a captured frame does not include at least one eye that appears to be looking forward, the computing device 102(1) may prompt the user to gaze in a particular direction (e.g., in a direction of the camera 110(1)) and capture additional frames. In response to determining that a captured frame includes at least one eye that appears to be looking forward, a portion that includes the at least one eye may be extracted from the captured frame and stored in the database 124(1) (e.g., in the stored portions 126(1)). Each of the stored portions 126(1) may include a left eye, a right eye, or both the left eye and the right eye. In some cases, one or more of the captured frames may be stored in the database 124(1) (e.g., in the stored frames 128(1)).

At 418, the video conferencing session may be initiated. For example, in FIG. 1, after the computing device 102(1) has captured the stored portions 126(1) that include at least one eye that appears to be looking forward, the computing device 102(1) may send a message to the server 104 requesting that the computing device 102(1) be allowed to join a video conferencing session.

Thus, a computing device may prompt a participant to look in a particular direction (e.g., towards an imaging device) and capture video frames (i) when the computing device is used to join a video conference for the first time, (ii) each time the participant initiates the process of joining a video conference or (iii) the computing device may request user input as to whether to use previously stored frame(s) or capture new frame(s). For example, the first time the participant uses the computing device to join a video conference, the computing device may prompt the user to look in the direction of the video camera, capture one or more frames, store portions of the frames that include the participant's eyes, and use the stored portions of the frames to create modified frames during the video conference and in subsequent video conferences. As another example, each time the participant uses the computing device to join a video conference, the computing device may prompt the user to look in the direction of the video camera, capture one or more frames, store portions of the frames that include the participant's eyes, and use the stored portions to create modified frames during the video conference. As yet another example, each time the participant uses the computing device to join a video conference, the computing device may display previously captured frame(s) and prompt the participant, "Do you wish to use the previously captured frame(s) or do you wish to capture new frame(s)?"

FIG. 5 is a flowchart of a process 500 that includes determining that a frame includes a face according to some embodiments. The process 500 may be performed by one or more software modules executing on the server 104, or executing on one or more of the computing devices 102(1) to 102(N).

At 502, a frame (e.g., an image) of a video stream may be received. At 504, a determination may be made (e.g., using a classifier) that the frame includes a face. For example, in FIG. 1, the computing device 102(1) may receive the frame 114(1) from the camera 110(1) and a classifier executing on the computing device 102(1) may determine whether the frame 114(1) includes a human face. For example, the classifier may be trained to recognize facial features to determine whether a frame includes a face of a human being.

At 506, a first portion that includes a first pair of eyes may be extracted from the frame. At 508, a determination may be made (e.g., using a classifier) whether the first pair of eyes appear to be looking in a forward direction. For example, in FIG. 1, a classifier executing on the computing device 102(1) may determine which portions of the frame 114(1) includes eyes of a human. The decomposer 118(1) may decompose the frame 114(1) into the portions 116(1). For example, a first portion of the portions 116(1) may include at least one of the eyes while a second portion of the portions 116(1) may include a remainder of the face (or a remainder of the frame). The classifier may be trained to recognize parts of a face, such as individual eyes or a pair of eyes. The classifier may be trained to determine (e.g., by analyzing a location of each pupil relative to the rest of the eye) in which direction each eye appears to be looking. The classifier may be trained to determine whether each eye appears to be looking in a forward direction (e.g., by determining whether each pupil is approximately centered in each eye or whether each pupil is closer to an edge of the eye, indicating that the participant is looking to the side, above, or below).

In response to determining, at 508, that ("no") the first pair of eyes do not appear to be looking in the forward direction, a stored portion that includes a second pair of eyes that appear to be looking in the forward direction may be retrieved from a database, at 510. At 512, the frame may be modified by substituting the portion (e.g., in which the eyes do not appear to be looking forward) with the stored portion (e.g., in which the eyes appear to be looking forward) to create a modified frame. At 514, the modified frame may be sent to a server, and the process may proceed to 502 to receive a next frame. For example, in FIG. 1, if the classifier determines that the frame 114(1) includes a first pair of eyes that do not appear to be looking forward, the matcher 120(1) may identify one (or more) of the stored portions 126(1) that include a second pair of eyes that appear to be looking in the forward direction. The frame modifier 122(1) may modify the frame 114(1) using one (or more) of the stored portions 126(1) to create the modified frame 123(1). The computing device 102(1) may send the modified frame 123(1) (e.g., instead of sending the frame 114(1)) to the server 104. The computing device 102(1) may send a video stream that includes multiple frames to the server 104 for distribution to other participating devices (e.g., the computing device 102 (N)). The multiple frames sent to the server 104 may include zero or more unmodified frames, such as the frame 114(1) captured by the camera 110(1). The multiple frames sent in the video stream to the server 104 may include zero or more modified frames, such as the modified frame 123(1) created based on the frame 114(1) and one or more of the stored portions 126(1).

In response to determining, at 508, that ("yes") the first pair of eyes appear to be looking in the forward direction, the frame may be sent to a server, at 516. At 518, a determination may be made whether the first portion matches a stored portion in the database. In response to determining that ("no") the first portion does not match a stored portion in the database, the first portion may be added to the database, at 520, and the process may proceed to 502 to receive a next frame. In response to determining that ("yes") the first portion matches a stored portion in the database, the process may proceed to 502 to receive a next frame. For example, in FIG. 1, if the classifier determines that the frame 114(1) includes a first pair of eyes that appear to be looking forward, the matcher 120(1) may determine whether the portions 116(1) that include the eyes match one or more of the stored portions 126(1), e.g., whether the database 124(1)

already includes similar portion(s). If the matcher 120(1) determines that the portions 116(1) that include the eyes matches one or more of the stored portions 126(1) (e.g., the database 124(1) already includes similar portion(s)), then the frame 114(1) may be sent (e.g., in the data 144) to the server 104 for distribution to other participating devices, and the computing device 102(1) may receive a next frame from the camera 110(1). If the matcher 120(1) determines that the portions 116(1) that include the eyes do not match the stored portions 126(1) (e.g., the database 124(1) does not include similar portion(s)), then the one or more of the portions 116(1) that include the eyes may be added to the stored portions 126(1) in the database 124(1). The computing device 102(1) may send the frame 114(1) (e.g., in the data 144) to the server 104 for distribution to other participating devices, and receive a next frame from the camera 110(1).

Thus, a frame of a video stream may be received from an imaging device (e.g., a camera). If the frame does not include a face, the frame may be sent to a server. If the frame includes a face, the frame may be decomposed into at least two portions, a first portion that includes the eyes and a second portion that includes a remainder of the face (or a remainder of the frame). If a classifier determines that the eyes in the first portion do not appear to be looking forward, a search may be done to identify a stored portion in which the eyes appear to be looking forward, the stored portion may be blended with the frame (or the second portion that includes a remainder of the frame) to create a modified frame. The modified frame may be sent to the server.

If the classifier determines that the eyes in the first portion appear to be looking forward, a search may be done to determine if the first portion matches a stored portion in the database. If the first portion does not match any of the stored portions in the database, the first portion may be stored in the database, and the frame may be sent to the server. If the first portion matches at least one of the stored portions in the database, the frame may be sent to the server. In this way, if a frame is captured in which the participant appears to be looking forward, the portion that includes the eyes may be added to the database if a similar (e.g., matching) portion is not included in the database. If a frame is captured in which the participant does not appear to be looking forward (e.g., appears to be looking up, down, to the side, etc.), a stored portion in which the participant appears to be looking forward may be combined with the frame to create a modified frame in which the participant appears to be looking forward.

Figure 6:
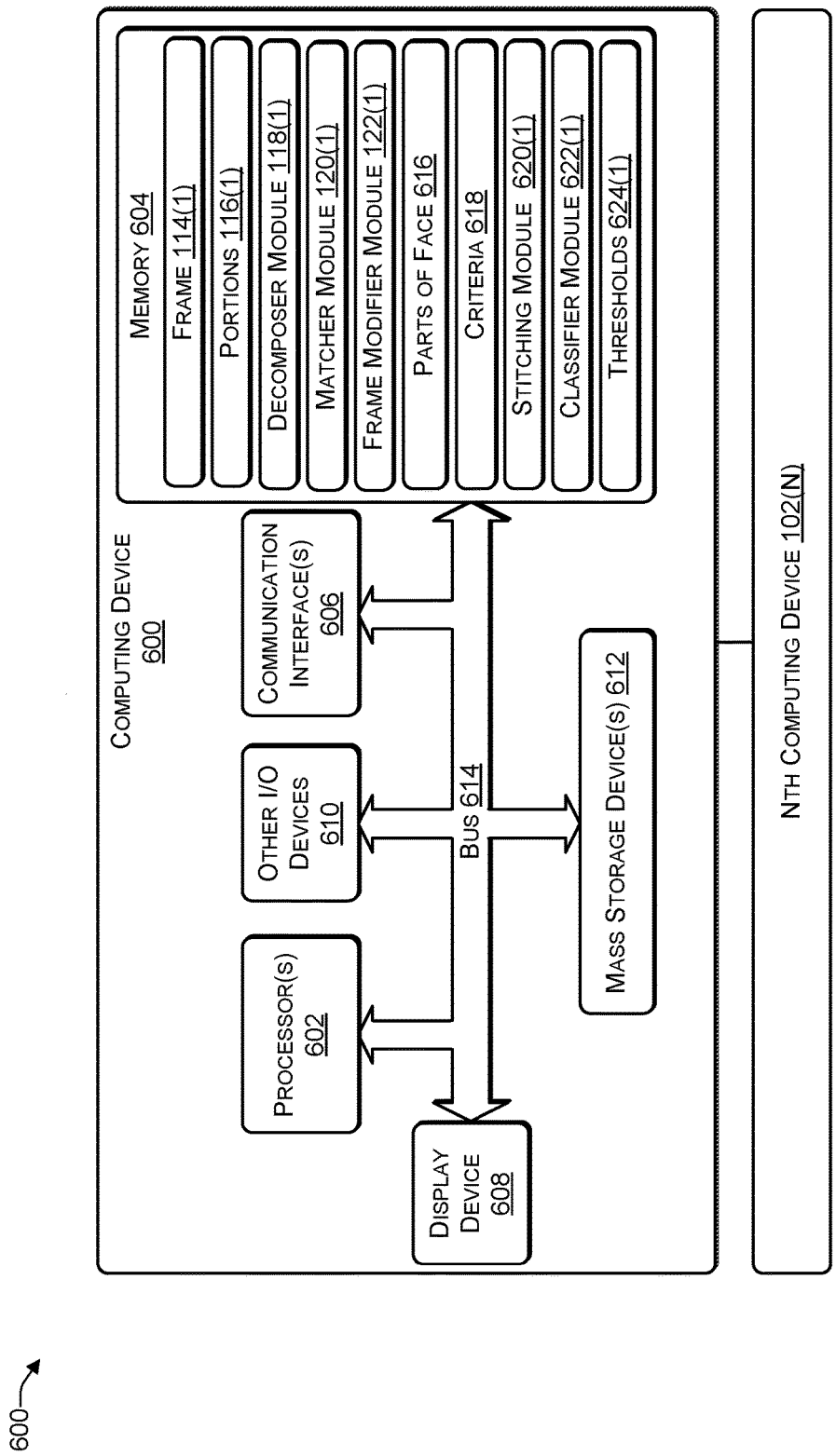
FIG. 6 illustrates an example configuration of a computing device that can be used to implement the systems and techniques described herein.

FIG. 6 illustrates an example configuration of a computing device 600 that can be used to implement the systems and techniques described herein, such as to implement the computing devices 102(1) to 102(N) of FIG. 1 or the server 104 of FIG. 1. The computing device 600 may include one or more processors 602, a memory 604, communication interfaces 606, a display device 608, other input/output (I/O) devices 610, and one or more mass storage devices 612, configured to communicate with each other, such as via a system bus 614 or other suitable connection.

The processor 602 is a hardware device (e.g., an integrated circuit) that may include a single processing unit or a number of processing units, all or some of which may include single or multiple computing units or multiple cores. The processor 602 can be implemented as one or more microprocessors, microcomputers, microcontrollers, digital signal processors, central processing units, state machines, logic circuitries, and/or any devices that manipulate signals based on operational instructions. Among other capabilities, the processor 602 can be configured to fetch and execute computer-readable instructions stored in the memory 604, mass storage devices 612, or other computer-readable media.

Memory 604 and mass storage devices 612 are examples of computer storage media (e.g., memory storage devices) for storing instructions which are executed by the processor 602 to perform the various functions described above. For example, memory 604 may generally include both volatile memory and non-volatile memory (e.g., RAM, ROM, or the like) devices. Further, mass storage devices 612 may include hard disk drives, solid-state drives, removable media, including external and removable drives, memory cards, flash memory, floppy disks, optical disks (e.g., CD, DVD), a storage array, a network attached storage, a storage area network, or the like. Both memory 604 and mass storage devices 612 may be collectively referred to as memory or computer storage media herein, and may be a media capable of storing computer-readable, processor-executable program instructions as computer program code that can be executed by the processor 602 as a particular machine configured for carrying out the operations and functions described in the implementations herein.

The computing device 600 may also include one or more communication interfaces 606 for exchanging data via a network with a server and other computing devices. The communication interfaces 606 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, cellular, satellite, etc.), the Internet and the like. Communication interfaces 606 can also provide communication with external storage (not shown), such as in a storage array, network attached storage, storage area network, or the like.

A display device 608, such as a monitor may be included in some implementations for displaying information and images to users. Other I/O devices 610 may be devices that receive various inputs from a user and provide various outputs to the user, and may include a keyboard, a remote controller, a mouse, a printer, audio input/output devices, and so forth.

The computer storage media, such as memory 604 and mass storage devices 612, may be used to store software and data. For example, the computer storage media may be used to store software programs and data, such as the decomposer module 118(1), the matcher module 120(1), the frame modifier module 122(1), parts of a face 616(1), one or more criteria 618(1), a stitching module 620(1), a classifier module 622(1), and one or more thresholds. The classifier module 622 may implement a machine learning algorithm, such as a support vector machine or other machine learning technique. The classifier module 622(1) may be used to determine whether a frame includes a face. The classifier module 622(1) may be used to determine whether a portion of a frame includes one or more parts of face 616(1), such as an eye, both eyes, a mouth, a node, eyebrows, etc. In some cases, the classifier module 622(1) may be used to determine whether the parts of face 616(1) satisfy the criteria 618, e.g., whether one or both eyes appear to be looking forward. In this example, the criteria may specify a direction of a gaze of the eyes. The classifier module 622(1) may determine whether a portion includes one or more eyes, determine a direction in which the eyes appear to be looking, and determine whether eyes satisfy the criteria of appearing to be looking forward (e.g., an iris of an eye is located approximately in a middle of the eye). The stitching module 620(1) may implement an image stitching algorithm to combine multiple portions of frames (e.g., images) to modify a frame. The stitching module 620(1) may blend portions together and to reduce the visibility of seams between portions. Because a modified frame may use portions from more than one frame, the stitching module 620(1) may adjust a white balance of one or more portions being used to re-construct a frame, adjust colors of one or more portions being used to re-construct a frame, make another type of adjustment of one or more portions, or any combination thereof. The computer storage media may be used to store data, such as the frame 114(1), the portions 116(1), the database 124(1), the received databases 126(2) to 126(N), and one or more thresholds 624(1). For example, the thresholds 624(1) may include a threshold used to determine whether each of the portions 116(1) matches a sent portion in the database 124(1). For example, a particular portion of the portions 116(1) may match a sent portion in the database 124(1) when the particular portion differs from the sent portion by less than a threshold.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement pre-scribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, and can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Software modules include one or more of applications, bytecode, computer programs, executable files, computer-executable instructions, program modules, code expressed as source code in a high-level programming language such as C, C++, Perl, or other, a low-level programming code such as machine code, etc. An example software module is a basic input/output system (BIOS) file. A software module may include an application programming interface (API), a dynamic-link library (DLL) file, an executable (e.g., .exe) file, firmware, and so forth.

Processes described herein may be illustrated as a collection of blocks in a logical flow graph, which represent a sequence of operations that can be implemented in hardware, software, or a combination thereof. In the context of software, the blocks represent computer-executable instructions that are executable by one or more processors to perform the recited operations. The order in which the operations are described or depicted in the flow graph is not intended to be construed as a limitation. Also, one or more of the described blocks may be omitted without departing from the scope of the present disclosure.

Although various embodiments of the method and apparatus of the present disclosure have been illustrated herein in the Drawings and described in the Detailed Description, it will be understood that the disclosure is not limited to the embodiments disclosed, and is capable of numerous rearrangements, modifications and substitutions without departing from the scope of the present disclosure.

What is claimed is:

1. A computer-implemented method, comprising:
   determining, using a classifier, that a first frame of a video stream includes a face;
   extracting, using the classifier, a first portion of the first frame that includes a first pair of eyes;
   determining, using the classifier, that the first pair of eyes appear to be looking in a non-forward direction, wherein the non-forward direction is relative to a camera;
   retrieving, from a database, a stored portion that includes a second pair of eyes that appear to be looking in a forward direction, wherein the forward direction is relative to the camera; and
   modifying the first frame by replacing the first portion with the stored portion to create a modified frame;
   sending the modified frame to a videoconferencing server;
   determining that a second frame of the video stream includes the face;
   extracting a second portion of the second frame that includes a second pair of eyes;
   determining that the second pair of eyes appear to be looking in the forward direction;
   determining that the second portion does not match stored portions in the database;
   adding the second portion to the database; and
   sending the second frame to the videoconferencing server.

2. The computer-implemented method of claim 1, further comprising:
   determining that a third frame of the video stream excludes the face; and
   sending the third frame to the videoconferencing server.

3. The computer-implemented method of claim 1, wherein retrieving, from the database, the stored portion that includes the second pair of eyes that appear to be looking in the forward direction comprises:
   comparing the first portion with one or more stored portions in the database;
   determining that, excluding a direction in which the first pair of eyes are looking, the first portion matches the stored portion; and
   selecting the stored portion for inclusion in the modified frame.

4. The computer-implemented method of claim 1, further comprising:

determining a fingerprint comprising a hash of the first portion; and comparing the fingerprint with a stored fingerprint associated with the stored portion.

5. The computer-implemented method of claim 1, further comprising:

capturing one or more frames from the camera during a particular period of time;

determining that a particular frame of the one or more frames includes features of the face;

extracting, from the particular frame, a particular portion that includes the second pair of eyes; and storing the particular portion in the database to create the stored portion.

6. The computer-implemented method of claim 5, further comprising:

displaying a prompt requesting that a participant look in a direction of a camera for the particular period of time.

7. The computer-implemented method of claim 1, wherein modifying the first frame by replacing the first portion with the stored portion to create the modified frame comprises:

performing image stitching to overlay the stored portion over the first portion to create the modified frame.

8. One or more non-transitory computer-readable media storing instructions that are executable by one or more processors to perform operations comprising:

determining, using a classifier, that a first frame of a video stream includes a face;

extracting, using the classifier, a first portion of the first frame that includes a first pair of eyes;

determining, using the classifier, that the first pair of eyes appear to be looking in a non-forward direction relative to a camera;

retrieving, from a database, a stored portion that includes a second pair of eyes that appear to be looking in a forward direction relative to the camera; and modifying the first frame by replacing the first portion with the stored portion to create a modified frame;

sending the modified frame to a videoconferencing server;

determining that a second frame of the video stream includes the face;

extracting a second portion of the second frame that includes a second pair of eyes;

determining that the second pair of eyes appear to be looking in the forward direction;

determining that the second portion does not match stored portions in the database;

adding the second portion to the database; and sending the second frame to the videoconferencing server.

9. The one or more non-transitory computer-readable media of claim 8, wherein retrieving, from the database, the stored portion that includes the second pair of eyes that appear to be looking in the forward direction comprises:

comparing the first portion with one or more stored portions in the database;

determining that, excluding a direction in which the first pair of eyes are looking, the first portion matches the stored portion; and selecting the stored portion for inclusion in the modified frame.

10. The one or more non-transitory computer-readable media of claim 9, the operations further comprising:

determining one or more features associated with the first portion; and comparing the one or more features with particular features associated with the stored portion.

11. The one or more non-transitory computer-readable media of claim 9, the operations further comprising:

determining a fingerprint comprising a hash of the first portion; and comparing the fingerprint with a stored fingerprint associated with the stored portion.

12. The one or more non-transitory computer-readable media of claim 8, the operations further comprising:

displaying a prompt requesting that a participant look in a direction of a camera for a particular period of time; and capturing one or more frames from the camera.

13. The one or more non-transitory computer-readable media of claim 8, the operations further comprising:

creating the modified frame by using image stitching to overlay the stored portion over the first portion.

14. A computing device, comprising:

one or more processors; and one or more non-transitory computer-readable media storing instructions that are executable by the one or more processors to perform operations comprising:

determining, using a classifier, that a first frame of a video stream includes a face;

extracting, using the classifier, a first portion of the first frame that includes a first pair of eyes;

determining, using the classifier, that the first pair of eyes appear to be looking in a non-forward direction;

retrieving, from a database, a stored portion that includes a second pair of eyes that appear to be looking in a forward direction; and modifying the first frame by substituting the first portion with the stored portion to create a modified frame;

sending the modified frame to a videoconferencing server;

determining that a second frame of the video stream includes the face;

extracting a second portion of the second frame that includes a second pair of eyes;

determining that the second pair of eyes appear to be looking in a forward direction; and sending the second frame to the videoconferencing server;

determining that the second portion does not match stored portions in the database; and adding the second portion to the database.

15. The computing device of claim 14, the operations further comprising:

determining one or more features associated with the first portion; and comparing the one or more features with particular features associated with the stored portion.

16. The computing device of claim 14, the operations further comprising:

determining that a third frame of the video stream excludes the face; and sending the third frame to the videoconferencing server.

17. The computing device of claim 14, the operations further comprising:

capturing one or more frames during a particular period of time;

determining that a particular frame of the one or more frames includes the face;

extracting, from the particular frame, a particular portion that includes the second pair of eyes; and storing the particular portion in the database to create the stored portion.

18. The computing device of claim 14, the operations further comprising:
performing image stitching to overlay the stored portion over the first portion to create the modified frame.

19. The computing device of claim 14, the operations wherein retrieving, from the database, the stored portion that includes the second pair of eyes that appear to be looking in the forward direction comprises:
comparing the first portion with one or more stored portions in the database;
determining that, excluding a direction in which the first pair of eyes are looking, the first portion matches the stored portion; and
selecting the stored portion for inclusion in the modified frame.

20. The computing device of claim 19, the operations further comprising:
determining a fingerprint comprising a hash of the first portion; and
comparing the fingerprint with a stored fingerprint associated with the stored portion.

\* \* \* \* \*